Patented Aug. 21, 1923.

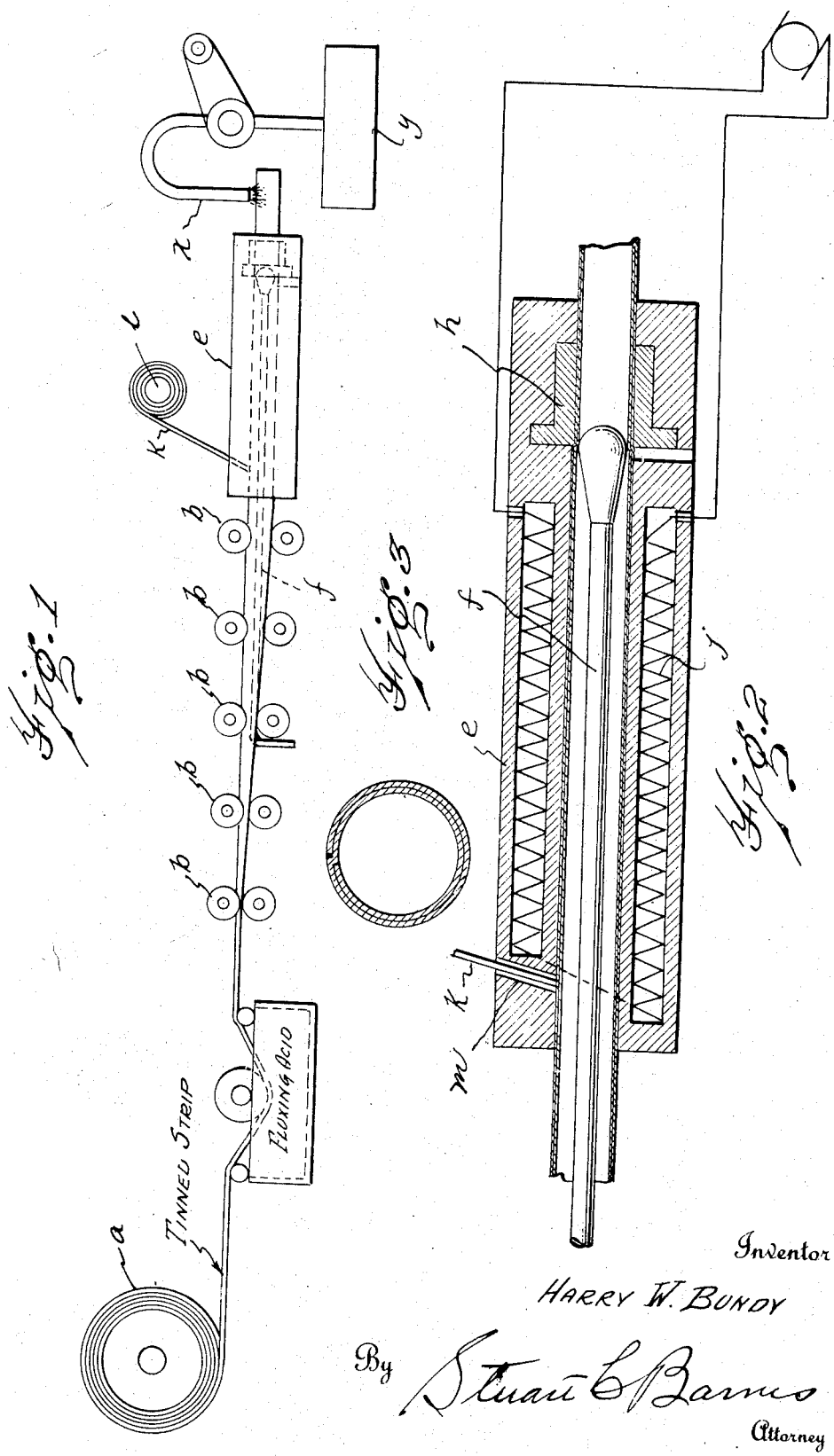

1,465,755

UNITED STATES PATENT OFFICE.

HARRY W. BUNDY, OF DETROIT, MICHIGAN.

METHOD OF MAKING TUBES.

Application filed April 13, 1922. Serial No. 552,362.

*To all whom it may concern:*

Be it known that HARRY W. BUNDY, a citizen of the United States, residing at Detroit, in the county of Wayne and State of Michigan, has invented certain new and useful Improvements in the Method of Making Tubes, of which the following is a specification.

This invention relates to tube making and has for its object a tube constructed of a plurality of plies of thin sheet metal soldered together.

This construction permits a liquid and air tight tube to be made by rolling or drawing a strip through dies as distinguished from seamless tubing. Radiator tubing and fluid conveying tubes used on automobiles are usually made out of seamless copper tubing. Lockseam tubing is sometimes used for radiators but it is not as satisfactory as it is liable to leak.

It is the object of the present invention to afford a tubing made by drawing a strip through rolls and dies, which however, has all the liquid tight characteristics of seamless tubing.

In the drawings:

Fig. 1 is a side elevation largely of a diagrammatic character showing the applicant's apparatus.

Fig. 2 is a longitudinal section of the sweating die.

Fig. 3 is a section of the completed tubing.

A strip of relatively thin copper is first coated with solder or what is usually called tin, the coating on either side does not exceed ½ a thousandth of an inch. It should be evenly distributed over both sides. This is preferably done by drawing the strip through a suitable bath of acid and then through molten solder and then over and between suitable rolls to evenly distribute the solder and dry it. However, the particular method in which the strip is tinned is no part of the invention hence the apparatus is not illustrated or described in detail.

The tinned strip is rolled up into a coil $a$, is then put through a rolling and sweating machine. Preferably the strip is first drawn through a bath of fluxing acid or acid solution, then through rollers $b$. These are only representative rolls as in practice it would be found that quite a large train of rolls are essential to properly fashion the tube into a cross section in the form of a coil of two plies. Inasmuch, however, as this is merely a job for a practical roll designer and tool maker, I have not illustrated the entire set of rolls that I find advisable to use in fashioning the cross section of the tube. The tube is then drawn through a sweating, soldering and sizing die, designated $e$. It will be found advisable to use an arbor or floater $f$ in connection with this die. The die may be heated by any suitable source of energy—gas flame or electric resistance coil, such as designated $j$. At one end of this die is inserted a reducing or sizing die $h$ which serves to properly size the tube.

In my prior Patent No. 1,431,368, I have described and claimed tubing made by a method somewhat similar and I have also claimed the method. However, in that application the strip was simply tinned and sweated. The strip was tinned, half of it on one side and half of it on the opposite side.

I have found that in order to get the very best results it is advisable to introduce a little additional solder into the sweating die, hence I provide a roll $i$ of soldering wire. The wire $k$ runs down through a passage $m$ into the sweating die. This solder will not be fed to the sweating die as fast as the tube runs through the die but relatively slower. I have found in actual practice that where the strip is tinned and then sweated that the solder does not always take hold all around the plies. I find that by introducing a little additional solder that rather unexpected results take place. The solder that is already on the tube draws the additional solder in between the plies, and there is an even uniform distribution of the solder all around the plies. At the same time all the solder takes hold and binds the plies together so that the plies form one unit. Just what is the explanation of these results I am not able to state but I find that the additional solder is a prerequisite of a fine grade of tubing of this character.

It is not a case of simply adding to the quantity of the solder because no better results are achieved by using a thicker coating of tin on the strip in the beginning. The tube seems to require an additional source of solder at the time the sweating takes place. If it were attempted to introduce all the solder at the time the sweating takes place no commercially practical results would be attained at all. It requires the presence of solder all around the tube to draw the new solder in by capillary action and make the proper distribution. With the two methods united, the very best results are attained, while with only the one method (sweating previously tinned metal) only relatively inferior results are attained, and while with the other method (introducing all the solder where the tube has been formed up) no satisfactory results can be attained.

Another feature of my process, which is not absolutely essential to the production of tube, but which produces a much higher grade of tube, is the means for setting the solder on the outside of the tube and between the plies and washing off the acid or acid solution. A tube or nozzle $x$ furnishes a longitudinal stream of hot water playing on the tube just as it leaves the sweating die. This sets the solder on the outside of the tube instanter. This prevents the molten tinned coating, upon the tube leaving the sweating die, from running down the sides of the tube and collecting at the bottom where it makes a burr. The water also washes off the fluxing acid which would otherwise leave black spots.

By using a tank $y$ under the nozzle and pumping the water from this tank, the water, after a short interval in the beginning, will keep itself hot by reason of running over the hot tube. I have found hot water much better for this purpose than cold water.

What I claim is:

1. The method of making tubing, which comprises forming a plural ply tube of tinned metal, while longitudinally traveling, and coincidently sweating and adding new melted solder to the tube while so traveling to secure the plies together.

2. The method of making tubing, which comprises forming a tinned metal strip up into a plural ply tube, and passing the tube through a heated die where a strip of solder wire is fed into the dies to provide solder which is drawn between the plies by the sweated solder afforded by the tinned coating on the metal strip.

3. The method of making tubing, which comprises tinning metal strip stock forming the same into a plural ply tube while longitudinally traveling, and then passing the same through a heated sweating die where additional solder is fed to the tube while in the same longitudinal movement.

4. The method of making tubing, which comprises tinning metal strip stock, forming the same into a plural ply tube, and then coincidently sweating, adding more solder, and sizing the tube while longitudinally traveling.

5. In a method of making tubing, the causing of a plural ply seamed tube having a solder film between the contacting plies, to travel longitudinally, and coincidently sweating and adding more solder to the tube at the seam while so traveling to secure the plies together.

In testimony whereof I affix my signature.

HARRY W. BUNDY.